(12) United States Patent
Mochizuki et al.

(10) Patent No.: US 6,395,352 B1
(45) Date of Patent: May 28, 2002

(54) FERROELECTRIC LIQUID CRYSTAL DISPLAY ELEMENT AND MANUFACTURING METHOD THEREOF

(75) Inventors: Akihiro Mochizuki; Toshiaki Yoshihara; Hironori Shiroto; Tetsuya Makino; Yoshinori Kiyota, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/672,714

(22) Filed: Sep. 28, 2000

Related U.S. Application Data

(62) Division of application No. 09/042,201, filed on Mar. 13, 1998, now Pat. No. 6,203,866.

(30) Foreign Application Priority Data

Sep. 17, 1997 (JP) ............................................. 9-252518

(51) Int. Cl.[7] .................. C09K 19/02; G02F 1/1339
(52) U.S. Cl. .................... 428/1.1; 349/172; 349/190
(58) Field of Search .................... 428/1.1; 252/299.01; 349/172, 190

(56) References Cited

U.S. PATENT DOCUMENTS

| | | | |
|---|---|---|---|
| 5,321,533 A | 6/1994 | Kumar | 359/51 |
| 5,530,566 A | 6/1996 | Kumar | 359/51 |
| 5,589,237 A | 12/1996 | Akashi et al. | 428/1 |
| 5,589,959 A | 12/1996 | Hikmet | 349/88 |
| 5,679,414 A | 10/1997 | Akashi et al. | 428/1 |
| 5,720,900 A | 2/1998 | Parri et al. | 252/299.66 |
| 5,830,385 A | 11/1998 | Lau et al. | 252/299.01 |
| 5,863,457 A | 1/1999 | Hasebe et al. | 252/299.01 |
| 5,906,770 A | 5/1999 | Amundson et al. | 252/299.01 |
| 5,949,508 A | 9/1999 | Kumar et al. | 349/122 |
| 5,972,240 A | 10/1999 | Kobayashi et al. | 252/299.01 |
| 6,203,866 B1 * | 3/2001 | Mochizuki et al. | 428/1.1 |

FOREIGN PATENT DOCUMENTS

| | | |
|---|---|---|
| GB | 2310505 | 8/1997 |
| JP | 6214218 | 8/1994 |
| JP | 6250185 | 9/1994 |
| WO | 9400106 | 8/1994 |

OTHER PUBLICATIONS

"Submicrosecond Bistable Electro–optic Switching in Liquid Crystals" by Noel A. Clark and Sven T. Lagerwall; Applied Physics Letter vol. 36, pp. 899–901, 1980.

"Advances in Ferroelectric Liquid Crystals for Micro–display Applications" by M.D. Wand et al.; SID 96 Digest, pp. 157–160, 1996.

"Ferroelectric Liquid Crystal Modulator Using Tristed Smectic Structure" by J.S. Patel; Applied Physics Letter, vol. 60, pp. 280–282, 1981.

* cited by examiner

Primary Examiner—Shean C. Wu
(74) Attorney, Agent, or Firm—Greer, Burns & Crain, Ltd.

(57) ABSTRACT

When a photopolymerization compound (molecular weight: not less than 300) having at least two ultraviolet light sensitive portions in its molecular structure is mixed with ferroelectric liquid crystal and an exposure to ultraviolet light is performed, a continuous structure is formed over almost whole length between two glass substrates, and a continuous twisted structure is formed between the glass substrates in the state of liquid crystal molecular orientation. Before the exposure to ultraviolet light, the photopolymerization compound does not exhibit satisfactory compatibility with the ferroelectric liquid crystal to be mixed, but exhibits phase separation in the mixed state. The ferroelectric liquid crystal has a bookshelf layer structure.

5 Claims, 13 Drawing Sheets

(4 of 13 Drawing Sheet(s) Filed in Color)

┆┄┄┆ PHOTOSENSITIVE
┆┄┄┆ PORTION

US 6,395,352 B1

FERROELECTRIC LIQUID CRYSTAL DISPLAY ELEMENT AND MANUFACTURING METHOD THEREOF

This is a divisional of application Ser. No. 09/042,201, filed Mar. 13, 1998, which issued as U.S. Pat. No. 6,203,866 on Mar. 20, 2001.

BACKGROUND OF THE INVENTION

1. Field of the Invention

The present invention relates to a liquid crystal display element using ferroelectric liquid crystal and relates to a manufacturing method thereof.

2. Description of the Prior Art

In recent years, an opportunity to handle a lot of and various information by individuals is increasing rapidly with liberalization of telecommunication, and thus personal data processing apparatuses such as notebook-sized personal computers have spread remarkably. Moreover, because of the spread of multimedia, the contents of information to be handled are not only simple character information but also image information of high quality such as pictures.

Under such circumstances, display devices as data output apparatuses, more specifically flat panel displays are very important. Moreover, among the flat panel displays, liquid crystal displays by which an image of high accuracy and high contrast ratio can be obtained are used widely as display devices.

As the characteristics of the liquid crystal display used as a flat panel display for the data processing apparatus, the following characteristics (a) through (e) are given:

(a) a high information content display such as XGA (Extended Graphics Array) and SXGA (Super Extended Graphics Array) whose information contact is the greatest in the flat panel display is possible;

(b) a level of the back ground "black" is excellent by using a polarization film of crossed Nicols, and a high contrast ratio of 200:1 can be obtained;

(c) a problem of gray scale display remains, but a moving picture can be displayed on a level equivalent to VGA (Video Graphics Array);

(d) in the flat panel display, display with comparatively low power is possible; and (e) product results in notebook-sized computers, etc. are achieved, and the great variety of peripheral members such as driver LSIs can be obtained.

However, with diversification of information to be handled, there arise technical problems of how to display an image of high quality such as a photograph on a liquid crystal display. As the technical problems of the conventional liquid crystal displays for attaining excellent functions, the following problems (A) through (D) are given:

(A) a viewing angle is small, so in order to enlarge the viewing angle, another functions such as an aperture ratio and producibility should be lowered;

(B) a response speed is slow, particularly the response speed of gray shades display is slow, and image quality of moving picture display is lowered remarkably;

(C) since the response of the moving picture display is slow, use efficiency of backlight is lowered, and thus luminance of a screen is lowered; and (D) an adjusting range of color balance which is indispensable for television display is remarkably narrow, namely, the adjustment is actually impossible.

There exist some possible methods which cope with the aforementioned technical problems of the liquid crystal display. The method which is very likely to solve all the problems (A) through (D) at the same time is a surface stabilized ferroelectric liquid crystal (SSFLC) display which was suggested by Noel A. Clark and Sven T. Lagerwall in Applied Physics Letter (Vol. 36, pp.899) in 1980.

SSFLC has a wide viewing angle in principle, and the contrast ratio does not actually depend on the viewing angle. Moreover, since SSFLC responds at a high speed to moving picture display, the image quality is not lowered. Further, according to the report in SID (Society for Information Display) (SID 96 DIGEST pp.157) by M. D. Wand et al. in 1996, color display by time domain makes it possible to adjust a color balance on a level equivalent to or higher than that of the conventional CRT (Cathode Ray Tube).

As mentioned above, SSFLC is very likely to improve the functions of a liquid crystal display, but it has a problem of gray shades display which is the most important factor for higher image quality. Since SSFLC provides binary display in principle, the dot matrix method, the dither method or the like have been used for the gray shades display. However, the gray shades display with half tone is indispensable for high-quality image display in multimedia, particularly for moving picture display. The half tone display in a high information content liquid crystal display such as XGA is possible by the control of the light intensity utilizing mildness of a voltage-light intensity curve and the control of time in the time domain color display. Since both of the aforementioned methods could not be applied to the conventional SSFLC technique, although the SSFLC display has a good possibility, it has not been put to practical use.

As a method which overcomes these defects of SSFLC, J. S. Patel suggested a ferroelectric liquid crystal display having a structure in which a layer structure of SSFLC is continuously twisted in Applied Physics Letter (Vol. 60, pp.280) in 1992. Since this display method has a structure in which a liquid crystal molecular axis is continuously twisted, the liquid crystal molecules are continuously displaced according to the applied electric field intensity, and the half tone display is possible in principle.

However, practically it is almost impossible that the ferroelectric liquid crystal is orientated while being continuously twisted. Even if the ferroelectric liquid crystal can be orientated temporarily, the twisted structure cannot be held stably for a long time. This is because since the ferroelectric liquid crystal has a layer structure, it cannot oppose a strong force to form a layer structure only by the stabilization of an interface on the surfaces of upper and lower substrates as suggested by J. S. Patel. Therefore, if the twisted structure of the ferroelectric liquid crystal which was suggested by J. S. Patel can be realized by any new method, the SSFLC display which can provide the half tone display is possible, and thus the SSFLC display can respond to the requirement for flat panel display of high definition.

BRIEF SUMMARY OF THE INVENTION

It is a main object of the present invention to provide a ferroelectric liquid crystal display element which is capable of moving picture display and half tone display at a high speed with a wide viewing angle, and relates to a manufacturing method thereof.

In the ferroelectric liquid crystal display element of the present invention, when a photopolymerization compound (molecular weight: not less than 300) having at least two ultraviolet light sensitive portions in its molecular structure is mixed with ferroelectric liquid crystal and an exposure to ultraviolet light is performed, a continuous structure is formed over almost whole length between two glass substrates, and a continuous twisted structure is formed between the glass substrates in the state of liquid crystal molecular orientation. Before the exposure to ultraviolet light, the photopolymerization compound does not exhibit satisfactory compatibility with the ferroelectric liquid crystal to be mixed, but exhibits phase separation in the mixed state. The ferroelectric liquid crystal has a bookshelf layer structure.

Since the ferroelectric liquid crystal display element of the present invention has such a structure, a viewing angle is wide, and high quality display by high-speed moving picture display and half tone display becomes possible. Particularly, when the ferroelectric liquid crystal display element of the present invention is driven by an active element such as TFT (Thin Film Transistor), a moving picture of high quality which has not been obtained before can be displayed on a liquid crystal display.

The above and further objects and features of the invention will more fully be apparent from the following detailed description with accompanying drawings.

BRIEF DESCRIPTION OF THE SEVERAL VIEWS OF THE DRAWINGS

The patent or application file contains at least one drawing executed in color. Copies of this patent or patent application publication with color drawings will be provided by the Patent and Trademark Office upon request and payment of the necessary fee.

DETAILED DESCRIPTION OF THE INVENTION

Figure 1:
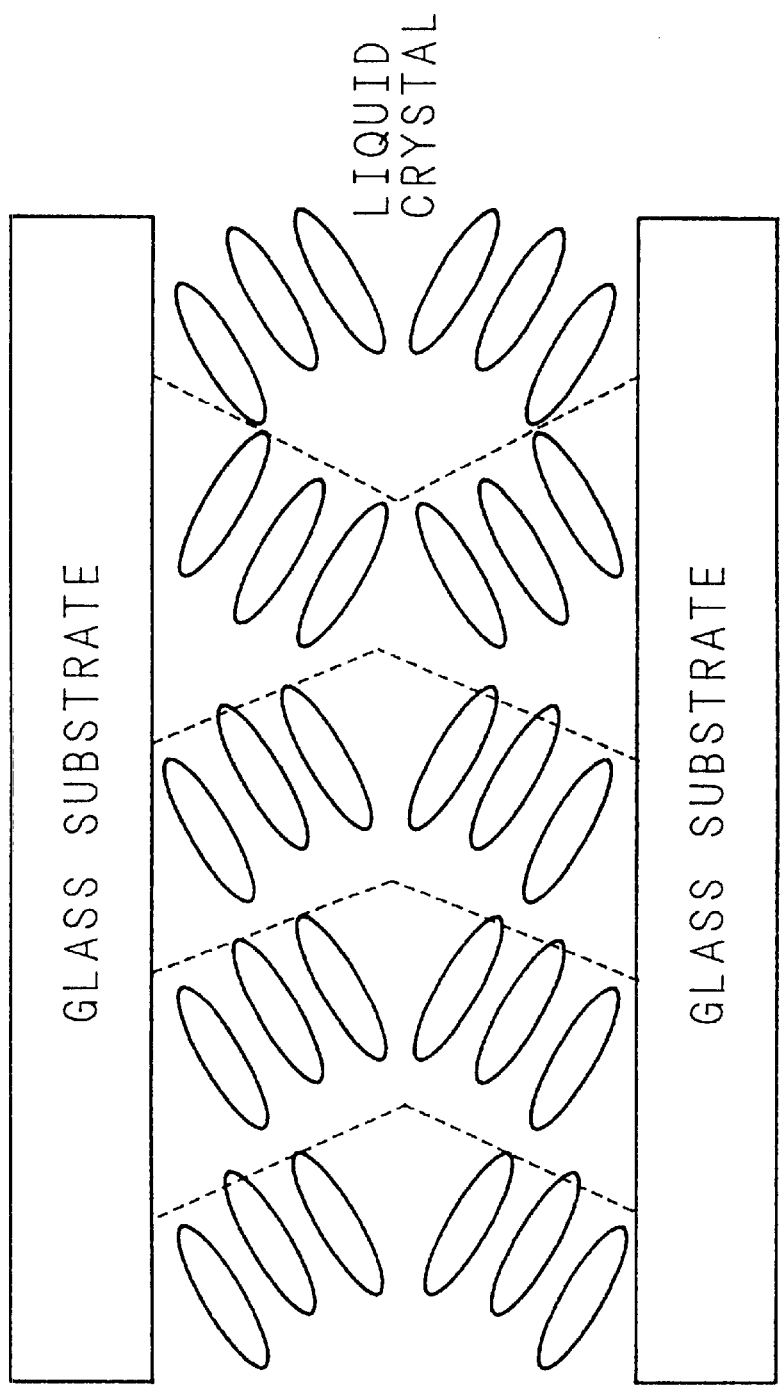
FIG. 1 is a drawing showing a Chevron layer structure of ferroelectric liquid crystal molecules.

First, the description is given as to the principle of the present invention.

The reason that a twisted ferroelectric liquid crystal structure cannot be stabilized is clear. This is because since the interaction between adjacent layers is very strong, the layers are liable to be arranged parallel. Therefore, an external force is required for arranging the layers with them being twisted. However, as mentioned above, only an interface orientation force on the surfaces of upper and lower substrates cannot twist the layer structure. This is because the force for maintaining the layer acts upon between each of the adjacent layers, on the contrary, the interface orientation force acts upon only between the surface of the substrate and liquid crystal which is adjacent to the substrate.

Therefore, the inventor considered that if a structure in which the layer structure is twisted simultaneously not only on the interface of the substrates but also in more places is provided as the force which opposes the interaction between the layers, the twisted ferroelectric liquid crystal structure becomes possible. The important thing here is that the layer structure should be twisted. Namely, if the layer structure is damaged because the layer structure is twisted excessively, the ferroelectric liquid crystal display cannot function. Namely, while the layer structure is being maintained, the layer structure should be twisted.

As a method of realizing such a state, the inventor devised the effective method in which a photopolymerization compound which is polymerized by ultraviolet light as well as a polymerization initiator is dispersed in ferroelectric liquid crystal, and after the phase is separated uniformly, in a chiral nematic phase where the liquid crystal has a helical structure, the photopolymerization compound is exposed and polymerized.

A method of mixing a so-called photopolymerization monomer is mixed in the ferroelectric liquid crystal, polymerizing the monomer in a smectic A-phase which exhibits a layer structure and stabilizing the layer structure itself has been reported. This method is originally used for reforming the state that the layer structure of the ferroelectric liquid crystal is unstable or the layer form is not preferable. Therefore, a large structure is not formed over spaces between layers, namely, over many spaces between layers, but a structure where the layer structure is maintained stably is basically formed only on one layer or a space between at most adjacent two layers. For this purpose, it is necessary for the photopolymerization substance to be added that its molecules are equivalent to or smaller than liquid crystal molecules and that the basic structure of the molecules are similar to that of the liquid crystal in order to realize the molecular orientation similar to the liquid crystal molecules. Therefore, in order to achieve this object, so-called liquid crystal molecules have been used. The liquid crystal molecules are such that the basic skeleton of molecules has the similar structure as liquid crystal, and they are dissolved in liquid crystal uniformly and the phase separation does not occur.

On the contrary, since several hundreds or several thousands of layer structures are continuously twisted in the present invention, the present invention is greatly different from the conventional techniques in the following points (1) through (3):

(1) a scale of structures which are formed over many spaces between layers in the liquid crystal is enormous;

(2) since adjacent layers are continuously twisted, it is necessary to intentionally lower compatibility of the photopolymerization substance to be added with the liquid crystal molecules, namely, it is necessary to cause phase separation; and (3) cooperation with the orientation force on the substrate interface is to be improved.

In order to realize (1) and (2), the photopolymerization substance to be added to the liquid crystal whose compatibility with the liquid crystal is low and which has a large molecular structure is required. For this purpose, it is effective that its molecular weight is bigger than that of the liquid crystal and a plurality of sites for photopolymerization to form a huge structure, namely, a plurality of photosensitive portions are provided by polymerization. Further, in order to limit compatibility with the liquid crystal molecules, it is important that the basic structure is different from that of the liquid crystal. Moreover, as for (3), since the photopolymerization substance to be added is liable to be influenced by the orientation force from the interface, it is necessary that the photopolymerization substance has hydrocarbon chain with a certain length.

As the additional matter (photopolymerization substance) which satisfies the above points (1) through (3) at the same time, there is a compound which has at least two photosensitive portions for photopolymerization and has hydrocarbon chain in its structure, and contains mainly hydrocarbon whose molecular weight is not less than 300. A length of the hydrocarbon chain, namely, a number of carbon atoms is at least 5 or more, preferably 10 or more in order to avoid compatibility with the liquid crystal molecules. Not only a monomer but also an oligomer such as a dimmer and trimer can be used as long as they satisfy the above factors. The molecular weight should be 300 or more because the molecular weight of normal ferroelectric liquid crystal is about 250.

When surfaces of upper and lower substrates are subject to an orientation process in which their directions intersect perpendicularly to each other or its directions are shifted from the direction where main axes of the molecular orientation are parallel, and the photopolymerization substance which satisfies the above conditions is added to the liquid crystal so as to be polymerized with the chiral nematic phase, the structure in which the liquid crystal layer structure is continuously twisted can be realized. The orientation process given to the surfaces of the upper and lower substrates is not limited to the process such that their directions intersect perpendicularly to each other because the photopolymerization of the present invention is performed in the chiral nematic phase. Namely, since the chiral nematic phase liquid crystal has a structure in which the liquid crystal molecules are originally twisted continuously, namely, the helical structure, it is not always necessary that the surfaces of the substrates are subject to the process for causing the orientation directions to intersect perpendicularly to each other such as a cross-rubbing process. However, in general, since a force to get a helical pitch in the chiral nematic phase, namely, a helical power is weak, it is occasionally effective to help the force to get the helical structure on the substrate interface.

Figure 2:
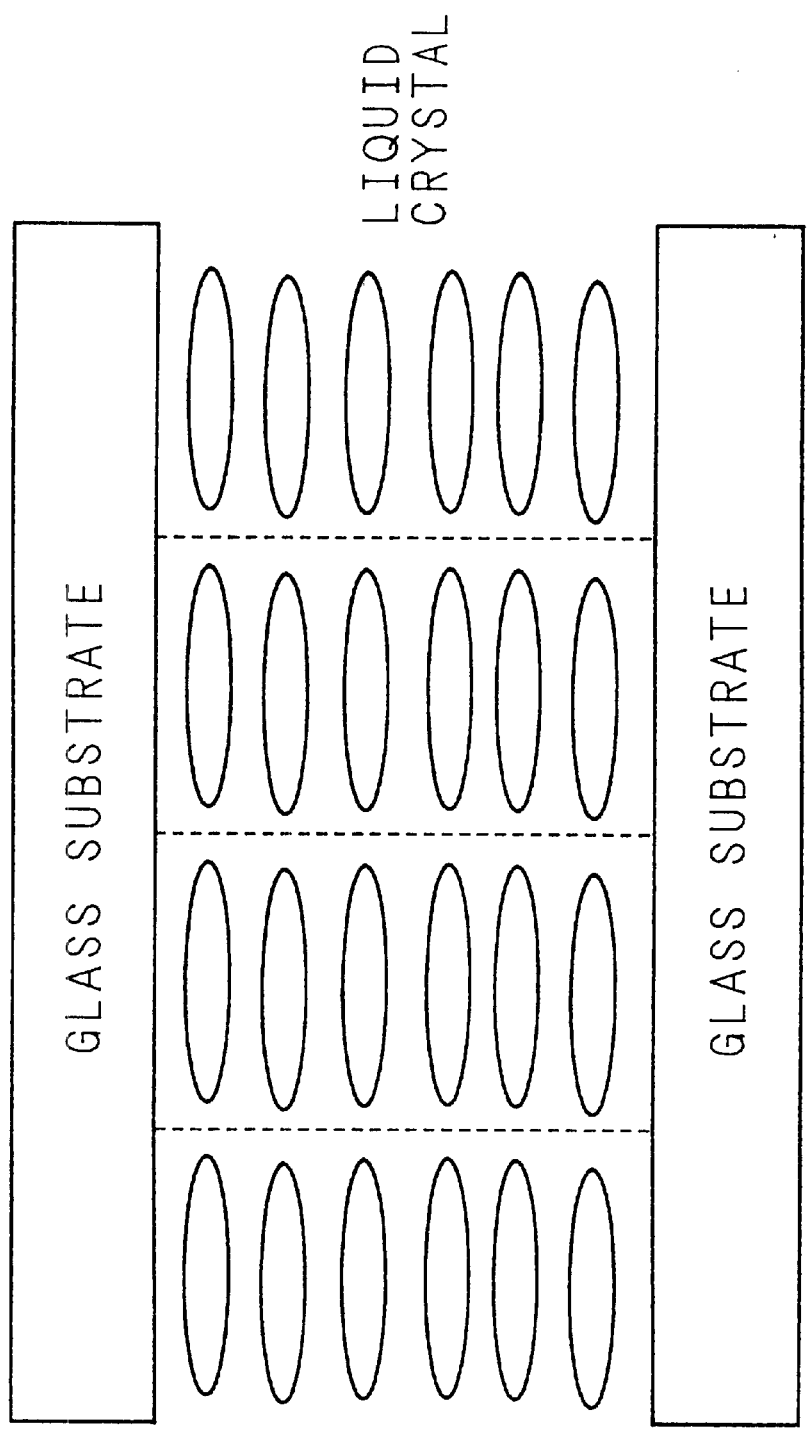
FIG. 2 is a drawing showing a bookshelf layer structure of ferroelectric liquid crystal molecules.

In addition, the layer structure of the ferroelectric liquid crystal is stabilized by forming a large structure in the liquid crystal according to the present invention. Namely, as shown in FIG. 1, the layer structure of the ferroelectric liquid crystal is generally a so-called Chevron layer structure which is curved in a dogleg shape, but as shown in FIG. 2, the bookshelf layer structure in which the layers are perpendicular to the substrates (glass substrates), or the quasi-bookshelf layer structure in which the layers are substantially perpendicular to the substrates can be obtained by forming the large structure according to the present invention.

A ferroelectric liquid crystal display can achieve the aforementioned very high performance suggested by Noel A. Clark, etc. by realizing the bookshelf layer structure. In general, in the Chevron layer structure, a zigzag-shaped orientation defect, namely, a zigzag defect occurs, and thus the contrast ratio is lowered remarkably. On the contrary, in the bookshelf layer structure, the satisfactory molecular orientation which has few defect can be obtained. As a result, in the bookshelf layer structure, a satisfactory contrast ratio can be obtained.

Particularly, in order to obtain the bookshelf layer structure easily, as the orientation force applied to the substrate interface, the pretilt angle is less than 10°, more preferably less than 3°. As a result, the respective ferroelectric liquid crystal molecules composing the layers become parallel with the substrate easily, so the bookshelf layer structure is formed spontaneously.

When an electric field is applied to between the two substrates in the state of the liquid crystal molecular orientation which was achieved in the aforementioned manner, an effective electric-optical characteristic can be obtained in the case where the tilt angle of the liquid crystal molecules is 40° to 50° after and before the application of the electric field, and when the tilt angle is 45°, the characteristic becomes the most effective. This is clear from the following formula representing polarization controllability of an optical medium arranged under crossed Nicols. Namely, this is because when $\phi$ in the formula is 40° to 50°, a transmitted light quantity I becomes large, and when $\phi$ is 45°, a transmitted light quantity I becomes maximum.

$$I = I_o \cdot \sin^2 2\phi \cdot \sin^2(2\pi \Delta n d / \lambda)$$

Figure 3:
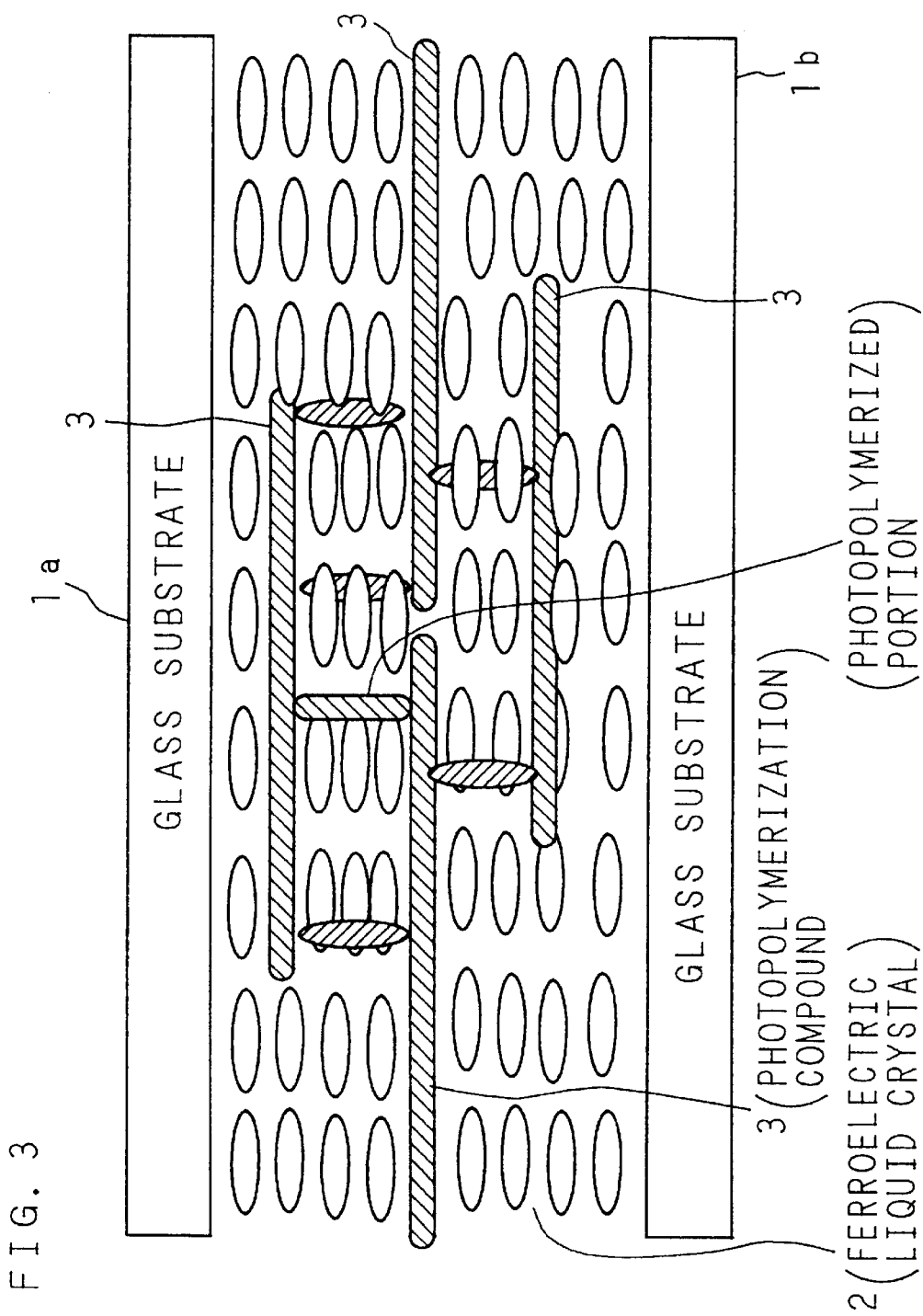
FIG. 3 is a conceptual diagram of a ferroelectric liquid crystal display element of the present invention.

$I_o$: incident light quantity
$\Delta n$: anisotropy of refractive index of liquid crystal
d: layer thickness of liquid crystal
$\lambda$: wavelength of incident light FIG. 3 is a conceptual diagram of the ferroelectric liquid crystal display element of the present invention. Ferroelectric liquid crystal 2 is sealed into a space between two transparent glass substrates 1a and 1b. Here, the inner surfaces of the glass substrates 1a and 1b are subject to the orientation process in which the orientation directions are caused to intersect perpendicularly to each other. A photopolymerization compound 3 whose molecular weight is 300 or more is added to the ferroelectric liquid crystal 2. The photopolymerization compound 3 has at least two ultraviolet light sensitive portions in its molecular structure. Moreover, the photopolymerization compound 3 does not exhibit satisfactory compatibility with the ferroelectric liquid crystal 2 to be mixed with it before exposure to ultraviolet light, and exhibits phase separation in the mixed state. Then, when the photopolymerization compound 3 mixed with the ferroelectric liquid crystal 2 is exposed to ultraviolet light in the phase separated state, the adjacent photopolymerization compounds 3 are polymerized in the ultraviolet light sensitive portions, and a large structure is formed over many layers in the ferroelectric liquid crystal 2, and thus the ferroelectric liquid crystal 2 has the bookshelf layer structure.

In such a manner, in the ferroelectric liquid crystal display element of the present invention, the photopolymerization compound 3 having at least two ultraviolet light sensitive portions in its molecular structure is mixed with the ferroelectric liquid crystal 2 the photopolymerization compound 3 is exposed to the ultraviolet light. As a result, the continuous structure is formed over almost all the distance between the two glass substrates 1a and 1b, and thus the continuous twisted structure can be formed between the glass substrate 1a and 1b in the state of the liquid crystal molecular orientation. Therefore, moving picture display and half tone display with a wide viewing angle and high speed are possible.

The following describes embodiments of the present invention.

Figure 4:
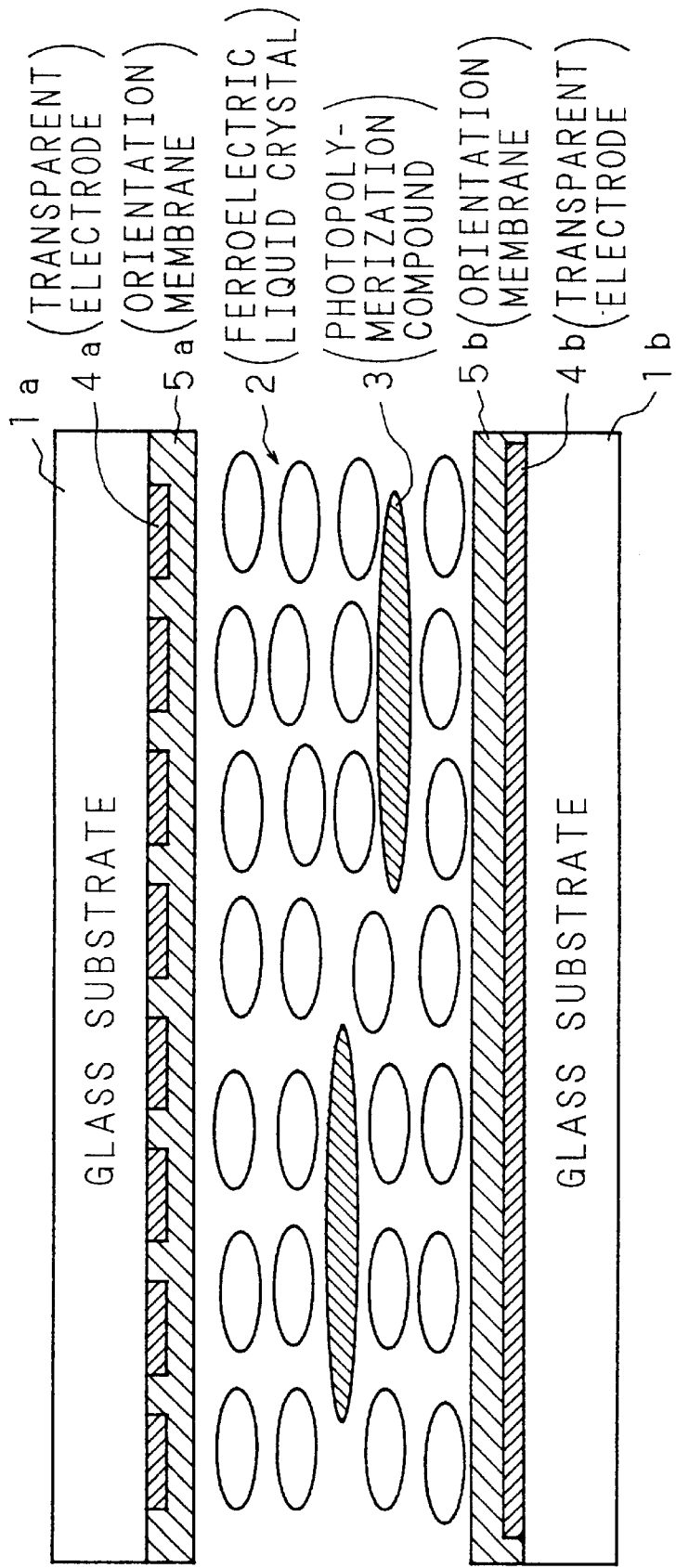
FIG. 4 is a drawing showing a basic constitution of the ferroelectric liquid crystal display element of the present invention.

FIG. 4 is a drawing showing a basic constitution of the ferroelectric liquid crystal display element of the present invention. In FIG. 4, 1a and 1b are two transparent glass substrates. A transparent electrode 4a which is one electrode for applying an electric field to pixel portions and an orientation membrane 5a whose surface was subject to the rubbing process are laminated on the upper glass substrate 1a. Moreover, a transparent electrode 4b which is the other electrode for applying an electric field and an orientation membrane 5b whose surface was subject to the rubbing process are laminated on the lower glass substrate 1b. For example, the transparent electrodes 4a and 4b are made of ITO, and the orientation membranes 5a and 5b are made of polyimide.

The laminated bodies respectively including the glass substrates 1a and 1b are arranged facing with each other so that the orientation membranes 5a and 5b face each other while being separated at a prescribed distance by a spacer (not shown) made of a glass ($SiO_2$) sphere, for example, and the ferroelectric liquid crystal 2 is sealed into a space of both the laminated bodies. The photopolymerization compound 3, to be mentioned later, is added into the ferroelectric liquid crystal 2. Then, when the photopolymerization compound 3 is exposed to an ultraviolet light to be polymerized, as shown in FIG. 3, a large structure can be formed over many layers in the ferroelectric liquid crystal 2.

The following describes concrete examples of the present invention.

(First Embodiment)

The liquid crystal orientation agent RN-713 made by Nissan Chemical Industries, Ltd. was applied to the surfaces of the glass substrates 1a and 1b having the transparent electrodes 4a and 4b with a spin coater so that the surfaces were fired, and the orientation membranes 5a and 5b were formed in a film thickness of about 500 Å. These orientation membranes 5a and 5b generally give a pretilt angle of less than 3° to liquid crystal molecules. The surfaces of the orientation membranes 5a and 5b were subject to the rubbing process by using nylon cloth. The glass substrate 1a was subject to the rubbing process in its longitudinal direction, and the glass substrate 1b was subject to the rubbing process so that the rubbing directions formed 90° when it is mounted to a panel. An $SiO_2$ sphere with average diameter of 1.6 μm was used as a spacer, and a cell gap was set to 1.8 μm after the mounting to the panel.

Figure 5A:
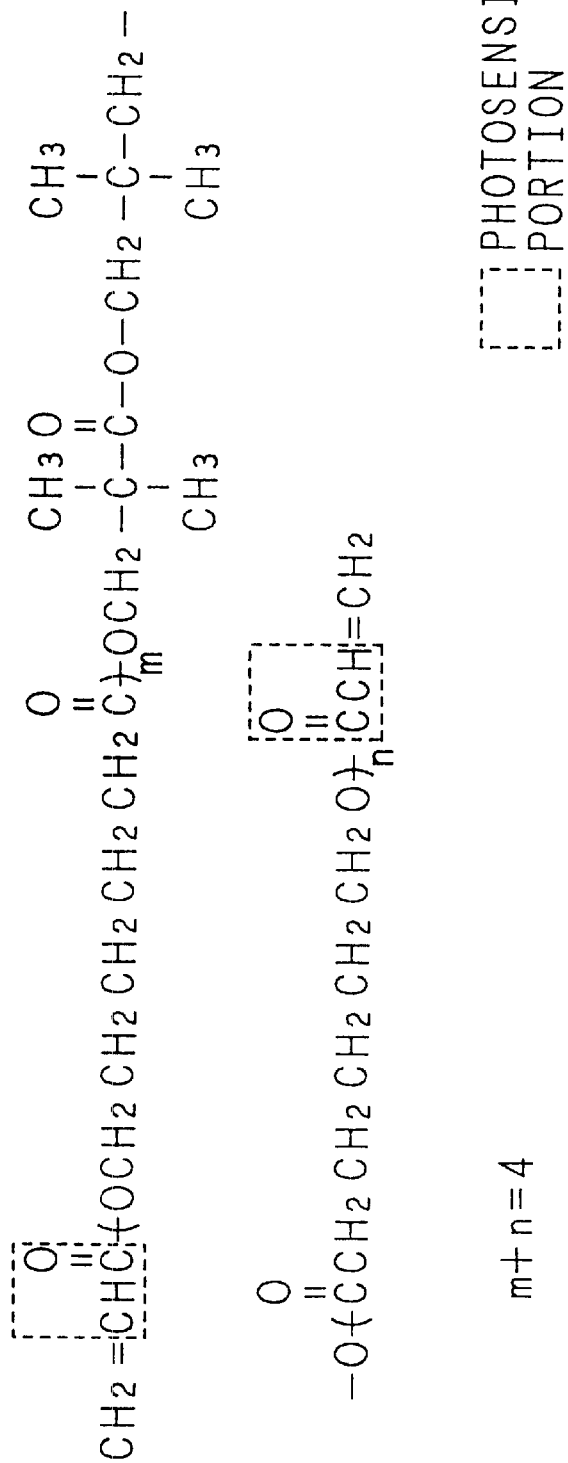
FIG. 5A is a drawing showing a structural formula representing one example of photosensitive oligomer to be added to the ferroelectric liquid crystal of the present invention.
Figure 5B:
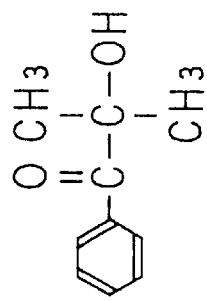
FIG. 5B is a drawing showing a structural formula representing one example of a photopolymerization initiator to be added to the ferroelectric liquid crystal of the present invention.

92 weight % of a ferroelectric liquid crystal composite (ZLI-4654-100 made by Merck), to which 6 weight % of a photosensitive oligomer (average molecular weight: 768) having the molecular structure shown in FIG. 5A and 2 weight % of a photopolymerization initiator shown in FIG. 5B was added, was injected into the cell. After the injection hole was sealed, ultraviolet light of 5 mW/cm$^2$ and center wavelength 360 nm was emitted to the cell for 250 seconds at a temperature of 62.5° C. exhibiting the chiral nematic phase so that photopolymerization was performed.

Figure 6:
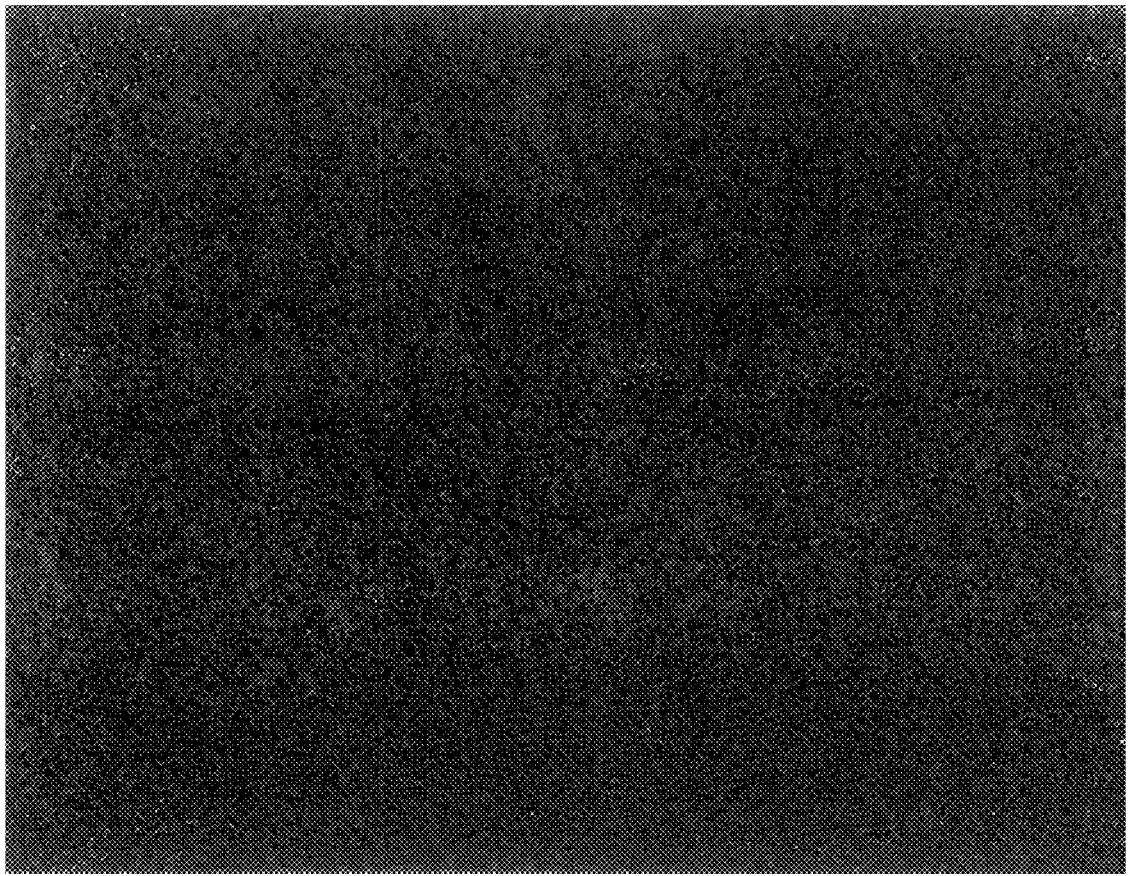
FIG. 6 is a microphotography showing a result of observing an orientation of the liquid crystal molecules of the present invention.

After being cooled to room temperature, a result of observing the molecular orientation through a polarization microscope is shown in FIG. 6. The structure shown in FIG. 3 can be formed in the liquid crystal cell by photopolymerizing the photosensitive oligomer, and as a result, the liquid crystal molecules form a bookshelf layer structure and as shown in FIG. 6, it is found that the very satisfactory, i.e., uniform molecular orientation could be obtained, and thus a high contrast ratio can be realized. Here, black spots in FIG. 6 represent the spacers.

Figure 7:
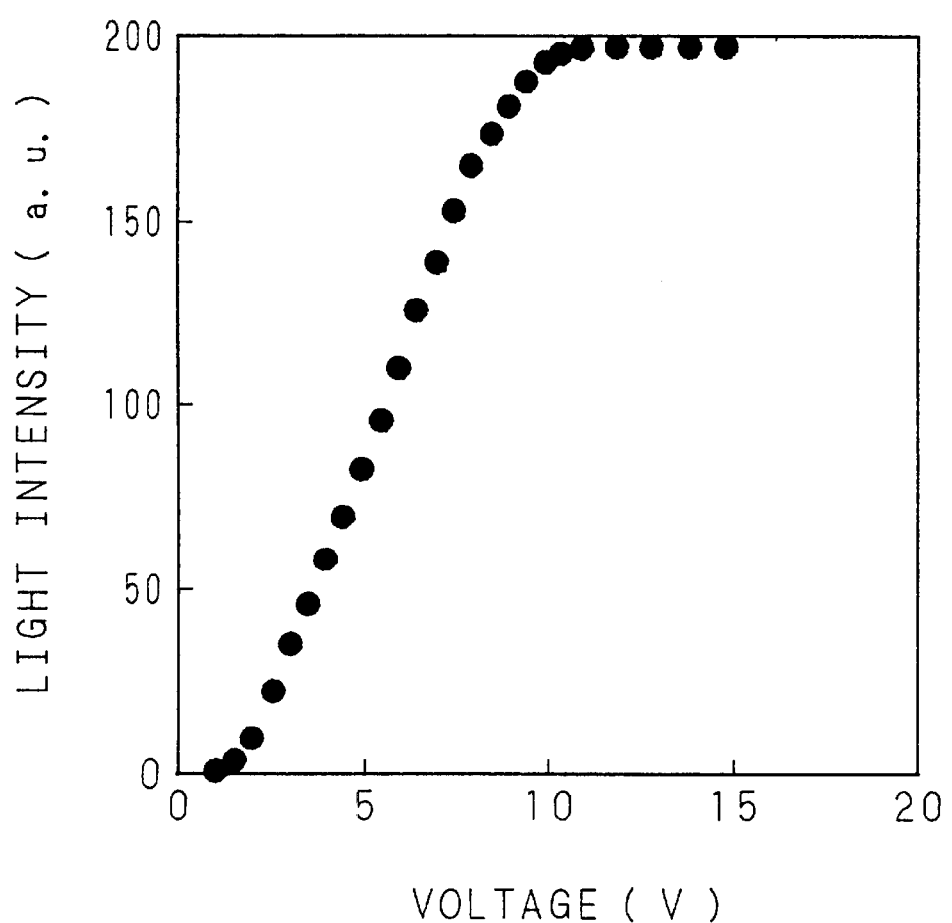
FIG. 7 is a graph showing an electric-optical characteristic (voltage-light intensity curve) in the ferroelectric liquid crystal display element of the present invention.

As a result of observation on the panel of the first embodiment through the polarization microscope, in the case where the panel was rotated through an angle of 90° in the crossed Nicols, a state in which light is hard to transmit appeared, so one evidence that the twisted layer structure was realized could be obtained. FIG. 7 shows an electric-optical characteristic (voltage-light intensity curve) in the case where a voltage of rectangular wave of 1 kHz was applied to the panel of the first embodiment with the voltage being raised gradually from 0V to 15V by 10 mV. It was confirmed that the light intensity changes substantially continuously according to the strength of the applied voltage in the range of 0V to 10V, and thus the so-called half tone display is possible.

In order to measure the response time of the panel of the first embodiment, a pulse voltage of 10V and 200 μsec. width was applied to the panel and time required for a change in the light intensity 10 to 90% was measured. As a result, the time was 110 μsec. at 22° C., and it was confirmed that sufficient responsibility was exhibited in SXGA display. Moreover, in order to measure the response time in the half tone, the response time was measured by changing a peak value of the applied voltage to 1, 2, 3, 4 and 5V, and as a result, the response time became respectively 505, 380, 220, 190 and 178 μsec., so it was found that the half tone can cope with SXGA display at a sufficient speed.

Comparative Example 1

The liquid crystal orientation agent RN-713 made by Nissan Chemical Industries, Ltd. was applied to the surfaces of the glass substrates 1a and 1b having the transparent electrodes 4a and 4b with a spin coater so that the surfaces were fired, and the orientation membranes 5a and 5b were formed in a film thickness of about 500 Å. The surfaces of the orientation membranes 5a and 5b were subject to the rubbing process by using nylon cloth. The glass substrate la was subject to the rubbing process in its longitudinal direction, and the glass substrate 1b was subject to the rubbing process so that the rubbing directions are parallel with each other when it is mounted to a panel. An $SiO_2$ sphere with average diameter of 1.6 μm was used as a spacer, and a cell gap was set to 1.8 μm after the mounting to the panel. The ferroelectric liquid crystal composite (ZLI-4654-100 made by Merck) was injected into the cell.

Figure 8:
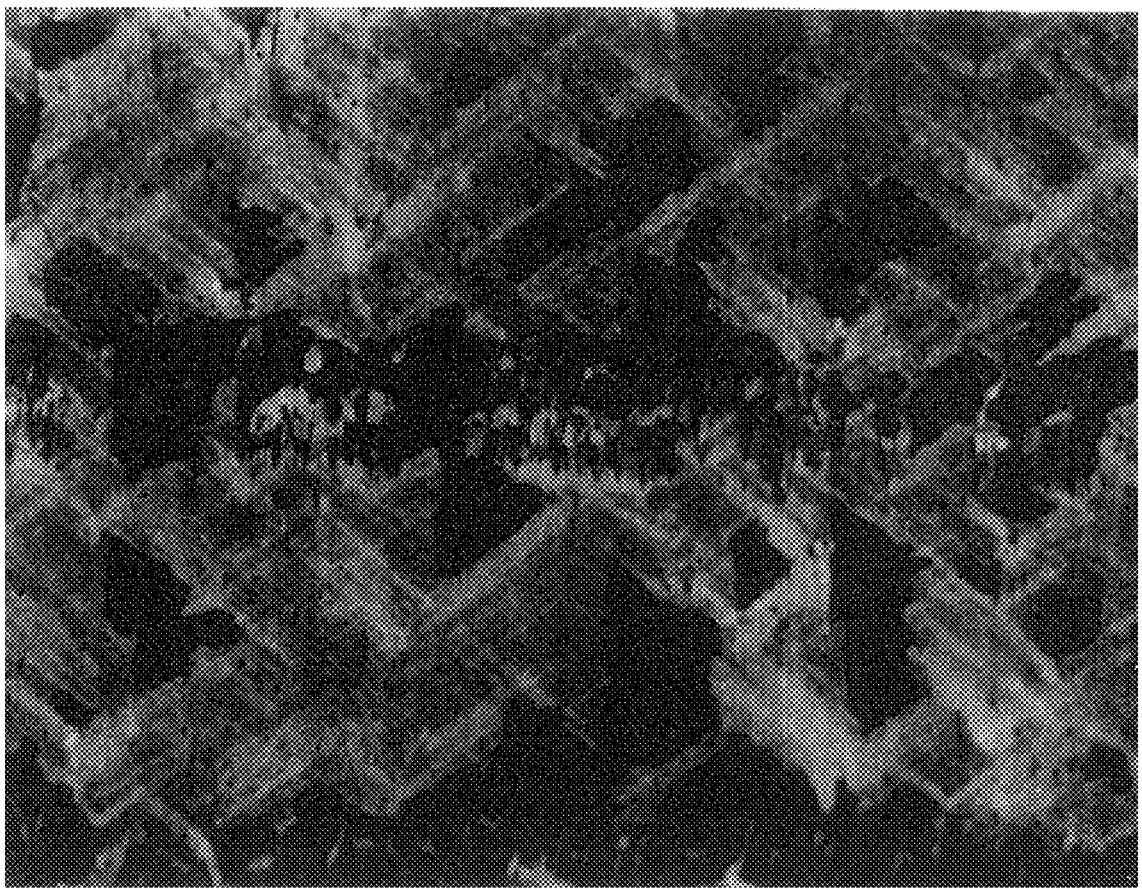
FIG. 8 is a microphotography showing a result of observing liquid crystal molecular orientation of a comparative example.

The result of observing the molecular orientation of the panel of the comparative example 1 through the polarization microscope is shown in FIG. 8. As shown in FIG. 8, innumerable zigzag defects (dogleg shaped orientation defect) occurred. The liquid crystal molecules formed the Chevron layer structure. As a result, a light leakage of "black" state occurs vigorously, and the contrast ratio was remarkably low. Therefore, the electric-optical characteristic was unsatisfactory.

Comparative Example 2

The liquid crystal orientation agent RN-713 made by Nissan Chemical Industries, Ltd. was applied to the surfaces of the glass substrates 1a and 1b having the transparent electrodes 4a and 4b with a spin coater so that the surfaces were fired, and the orientation membranes 5a and 5b were formed in a film thickness of about 500 Å. The surfaces of the orientation membranes 5a and 5b were subject to the rubbing process by using nylon cloth. The glass substrate 1a was subject to the rubbing process in its longitudinal direction, and the glass substrate 1b was subject to the rubbing process so that the rubbing directions made an angle of 90° when it is mounted to a panel. An $SiO_2$ sphere with average diameter of 1.6 μm was used as a spacer, and a cell gap was set to 1.8 μm after the mounting to the panel.

A ferroelectric liquid crystal composite (ZLI-4654-100 made by Merck) of 94.5 weight %, to which 5 weight % of liquid crystalline monoacrylate compound having a single sensitive portion and a pyrimidine skeleton, and 0.5 weight % of the same photopymerization initiator (FIG. 5B) as the first embodiment were added, was injected into the cell. After the injection hole was sealed, ultraviolet light of 5 mW/cm$^2$ and center wavelength 360 nm was emitted to the cell for 250 seconds at a temperature of 62.5° C. exhibiting the chiral nematic phase so that photopolymerization was performed.

Figure 9:
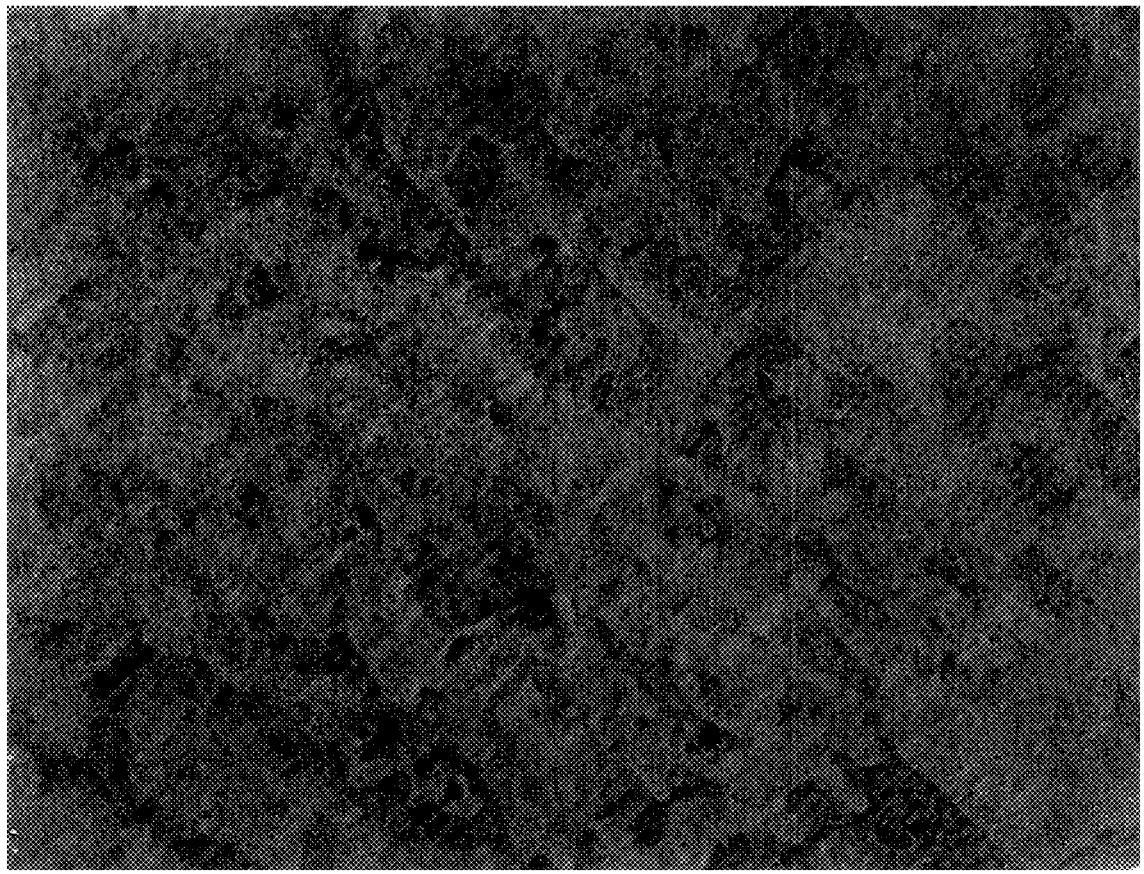
FIG. 9 is a microphotography showing a result of observing liquid crystal molecular orientation of a comparative example.

After being cooled to room temperature, a result of observing the molecular orientation through a polarization microscope is shown in FIG. 9. Comparatively uniform molecular orientation could be obtained.

Figure 10:
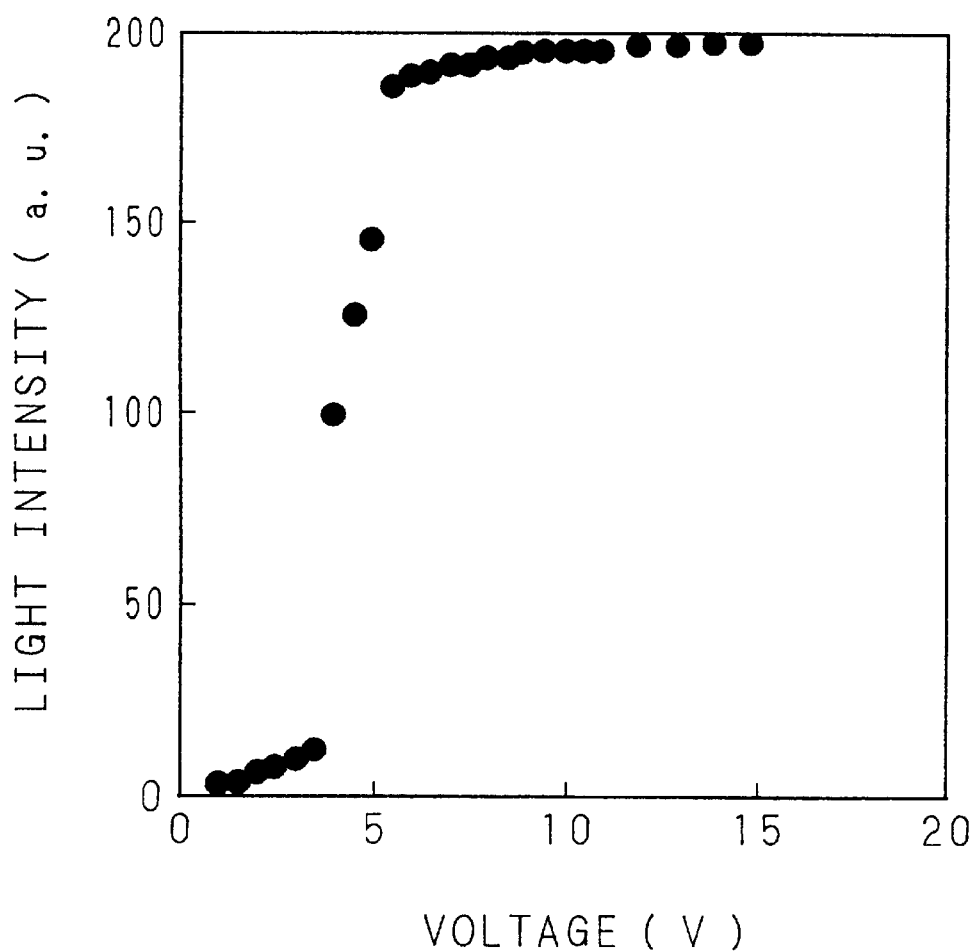
FIG. 10 is a graph showing an electric-optical characteristic (voltage-light intensity curve) in a ferroelectric liquid crystal display element of a comparative example.

As a result of observing the panel of the comparative example 2 through the polarization microscope, in the case where the panel was rotated through an angle of 45° in the crossed Nicols, a state in which light is hard to transmit appeared, so an evidence that the twisted layer structure was not realized could be obtained. FIG. 10 shows an electric-optical characteristic (voltage-light intensity curve) in the case where a voltage of rectangular wave of 1 kHz was applied to the panel of the comparative example 2 with the voltage being raised gradually from 0V to 15V by 10 mV. It was confirmed that the light intensity does not change continuously according to the strength of the applied voltage, and the light intensity changes abruptly when the voltage exceeds the threshold value, so half tone display is impossible.

In addition, in order to measure the response time of the panel of the comparative example 2, a pulse voltage of 10V and 200 μsec. width was applied to the panel and the time required for a change in the light intensity from 10 to 90% was measured. As a result, the time was 580 μsec. at 22° C., and it was confirmed that response could cope with SXGA display, but not less than five times as much time as the first embodiment was required.

(Second Embodiment)

The liquid crystal orientation agent RN-713 made by Nissan Chemical Industries, Ltd. was applied to the surfaces of the glass substrates 1a and 1b having the transparent electrodes 4a and 4b with a spin coater so that the surfaces were fired, and the orientation membranes 5a and 5b were formed in a film thickness of about 500 Å. The surfaces of the orientation membranes 5a and 5b were subject to the rubbing process by using nylon cloth. The glass substrate 1a was subject to the rubbing process in its longitudinal direction, and the glass substrate 1b was subject to the rubbing process so that the rubbing directions made an angle of 90° with respect to each other when it is mounted to a panel. An $SiO_2$ sphere with average diameter of 1.6 μm was used as a spacer, and a cell gap was set to 1.8 μm after the mounting to the panel.

Figure 11A:
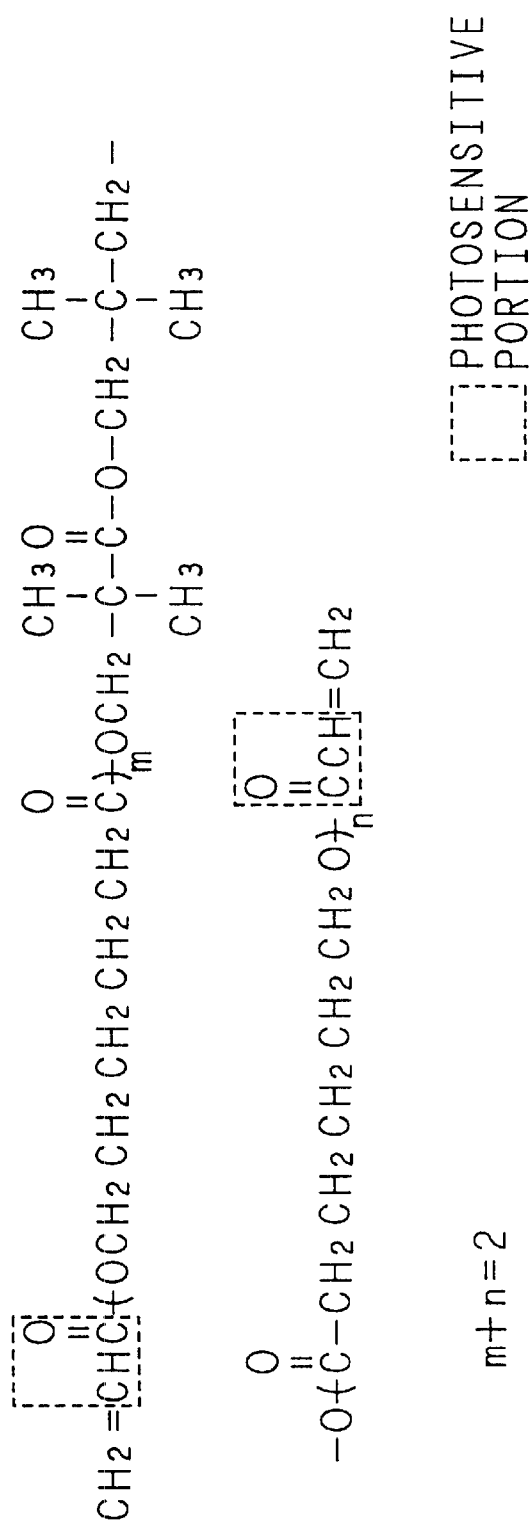
FIG. 11A is a drawing showing a structural formula representing another example of a photosensitive oligomer to be added to the ferroelectric liquid crystal of the present invention.
Figure 11B:
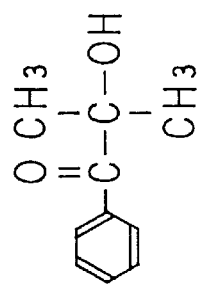
FIG. 11B is a drawing showing a structural formula representing one example of a photopolymerization initiator to be added to the ferroelectric liquid crystal of the present invention.

A ferroelectric liquid crystal composite (ZLI-4654-100 made by Merck) of 92 weight %, to which 6 weight % of a photosensitive oligomer (average molecular weight: 540) having the molecular structure shown in FIG. 11A and 2 weight % of a photopolymerization initiator shown in FIG. 11B were added, was injected into the cell. After the injection hole was sealed, ultraviolet light of 5 mW/cm$^2$ and center wavelength 360 nm was emitted to the panel for 250 seconds at a temperature of 62.5° C. exhibiting the chiral nematic phase so that photopolymerization was performed.

Figure 12:
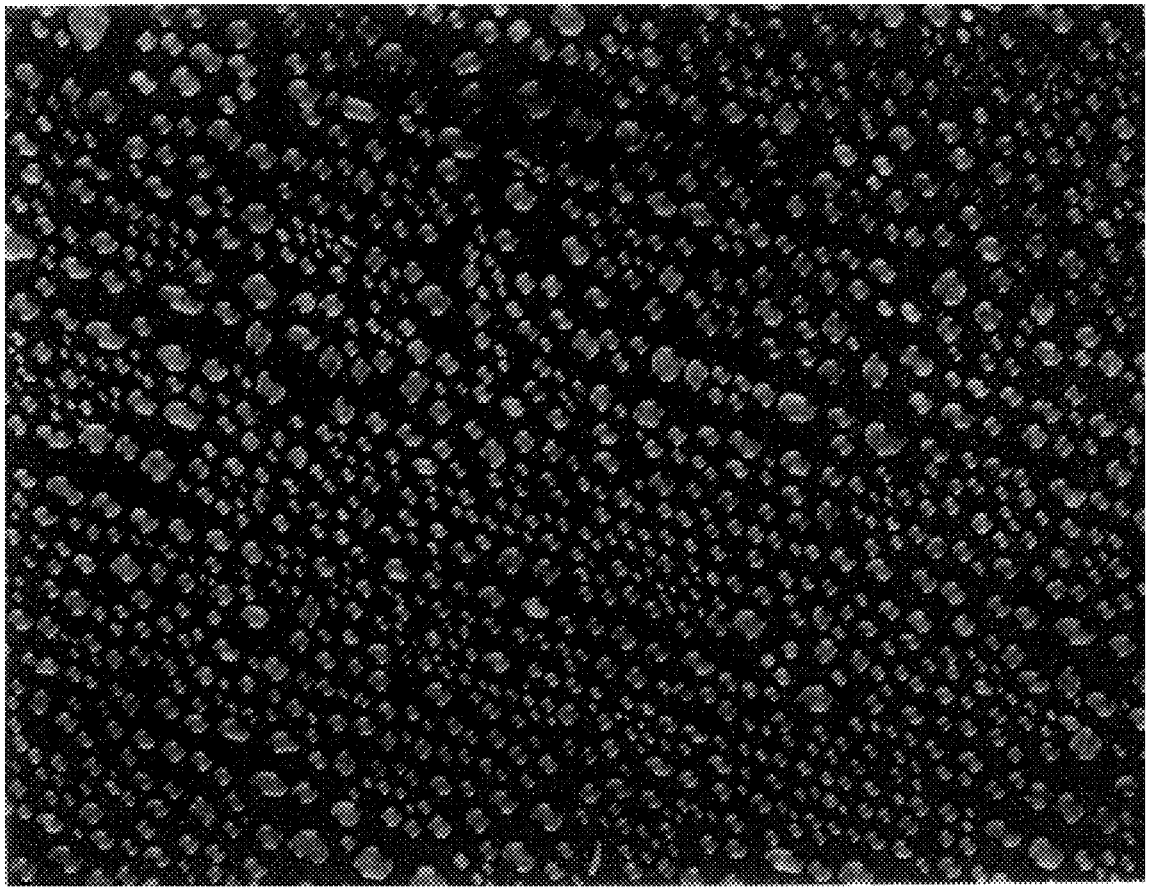
FIG. 12 is a microphotography showing a result of observing a state that the liquid crystal molecules of the present invention are mixed with a photosensitive compound.

After being cooled to room temperature, the molecular orientation was observed through a polarization microscope. As a result, it was found that very satisfactory, namely uniform molecular orientation, which is similar to that shown in FIG. 6 in the first embodiment could be obtained. Moreover, FIG. 12 shows a result of observation on a state in which the liquid crystal molecules were mixed with the photosensitive compound before emission of light to the panel in the second embodiment through the polarization microscope. As shown in FIG. 12, it was confirmed that phase separation occurs such that photosensitive compound is dotted in the liquid crystal. Here, in this phase separation was also confirmed in the first embodiment.

As a result of observing the panel of the second embodiment through the polarization microscope, in the case where the panel was rotated through an angle of 90° in the crossed Nicols, a state in which light is hard to transmit appeared, so evidence that the twisted layer structure was realized could be obtained. When a voltage of rectangular wave of 1 kHz was applied to the panel of the second embodiment with the voltage being raised gradually from 0V to 15V by 10 mV, the electric-optical characteristic (see FIG. 7) which is the same as that of the first embodiment was obtained, and it was confirmed that the light intensity changes substantially continuously according to the strength of the applied voltage and thus the half tone display is possible.

In order to measure the response time of the panel of the second embodiment, a pulse voltage of 10V and 200 μsec. width was applied to the panel and time required for a change in the light intensity 10 to 90% was measured. As a result, the time was 120 μsec. at 22° C., and it was confirmed that sufficient responsibility was exhibited in SXGA display.

(Third Embodiment)

The liquid crystal orientation agent RN-713 made by Nissan Chemical Industries, Ltd. was applied to the surfaces of the glass substrates 1a and 1b having the transparent electrodes 4a and 4b with a spin coater so that the surfaces were fired, and the orientation membranes 5a and 5b were formed in a film thickness of about 500 Å. In these orientation membranes 5a and 5b, a pretilt angle of less than 3° is generally given to the liquid crystal molecules. The surfaces of the orientation membranes 5a and 5b were subject to the rubbing process by using nylon cloth. The glass substrate 1a was subject to the rubbing process in its longitudinal direction, and the glass substrate 1b was subject to the rubbing process so that the rubbing directions made an angle of 90° with respect to each other when it is mounted to a panel. An SiO$_2$ sphere with average diameter of 1.6 µm was used as a spacer, and a cell gap was set to 1.8 µm after the mounting to the panel.

Figure 13A:
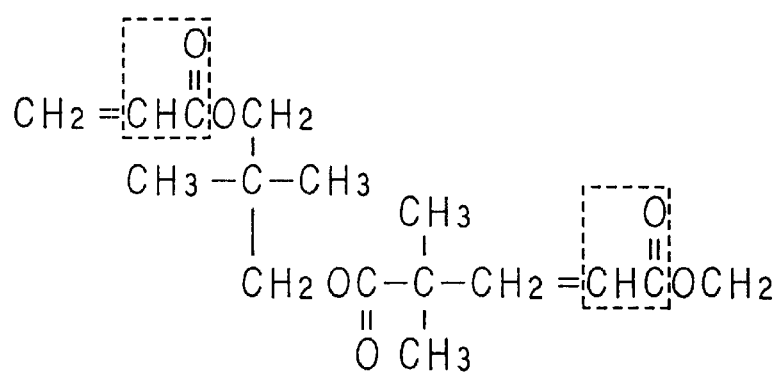
FIG. 13A is a drawing showing a structural formula representing still another example of a photosensitive oligomer to be added to the ferroelectric liquid crystal of the present invention.
Figure 13B:
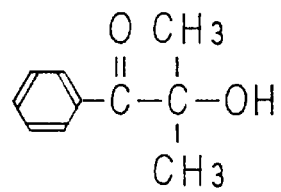
FIG. 13B is a drawing showing a structural formula representing one example of the photopolymerization initiator to be added to the ferroelectric liquid crystal of the present invention.

A ferroelectric liquid crystal composite (ZLI-4654-100 made by Merck) of 89 weight %, to which 8 weight % of a photosensitive oligomer (average molecular weight: 312) having the molecular structure shown in FIG. 13A and 3 weight % of a photopolymerization initiator shown in FIG. 13B were added, was injected into the cell. After the injection hole was sealed, ultraviolet light of 5 mW/cm$^2$ and center wavelength 360 nm was emitted to the panel for 250 seconds at a temperature of 60.5° C. exhibiting the chiral nematic phase so that photopolymerization was performed.

After being cooled to room temperature, the molecular orientation was observed through a polarization microscope. As a result, it was found that very satisfactory, namely uniform molecular orientation, which is similar to that shown in FIG. 6 in the first embodiment could be obtained. Moreover, as a result of observing a state in which the liquid crystal molecules were mixed with the photosensitive compound before emission of light to the panel in the third embodiment through the polarization microscope, similarly to FIG. 12 in the second embodiment, it was confirmed that phase separation occurs such that photosensitive compound is dotted in the liquid crystal.

As a result of observation on the panel of the third embodiment through the polarization microscope, in the case where the panel was rotated through an angle of 90° in the crossed Nicols, a state in which light is hard to transmit appeared, so one evidence that the twisted layer structure was realized could be obtained. When a voltage of rectangular wave of 1 kHz was applied to the panel of the third embodiment with the voltage being raised gradually from 0V to 15V by 10 mV, the electric-optical characteristic (see FIG. 7) which is the same as that of the first embodiment was obtained, and it was confirmed that the light intensity changes substantially continuously according to the strength of the applied voltage and thus the half tone display is possible.

In order to measure the response time of the panel of the third embodiment, a pulse voltage of 10V and 200 µsec. width was applied to the panel and the time required for a change in the light intensity 10 to 90% was measured. As a result, the time was 100 µsec. at 22° C., and it was confirmed that sufficient responsibility was exhibited in SXGA display.

(Fourth Embodiment)

A ferroelectric liquid crystal composite (CS-2004 made by Chisso Oil Chemical Corporation), to which the photosensitive oligomer and photopolymerization initiator which are the same as those in the first embodiment were added in the same ratio as the first embodiment, was injected into the cell having the same panel structure as that in the first embodiment so that photopolymerization was performed. CS-2004 is a ferroelectric liquid crystal composite in which the tilt angle of the molecules is 45°. The molecular orientation and electric-optical characteristic after photopolymerization of the cell in the fourth embodiment were the same as those in the first embodiment, so in the fourth embodiment, the half tone display and high-speed response were possible.

(Fifth Embodiment)

The liquid crystal orientation agent RN-713 made by Nissan Chemical Industries, Ltd. was applied to the surfaces of the glass substrates 1a and 1b having the transparent electrodes 4a and 4b with a spin coater so that the surfaces were fired, and the orientation membranes 5a and 5b were formed in a film thickness of about 500 Å. In these orientation membranes 5a and 5b, a pretilt angle of less than 3° is generally given to the liquid crystal molecules. The surfaces of the orientation membranes 5a and 5b were subject to the rubbing process by using nylon cloth. The glass substrate 1a was subject to the rubbing process in its longitudinal direction, and the glass substrate 1b was subject to the rubbing process so that the rubbing directions made an angle of 85° when it is mounted to a panel. An SiO$_2$ sphere with average diameter of 1.6 µm was used as a spacer, and a cell gap was set to 1.8 µm after the mounting to the panel.

A ferroelectric liquid crystal composite (ZLI-4654-100 made by Merck) of 92 weight %, to which 6 weight % of a photosensitive oligomer (average molecular weight: 768) having the molecular structure shown in FIG. 5A similar to that in the first embodiment, and 2 weight % of a photopolymerization initiator shown in FIG. 5B were added, was injected into the cell. After the injection hole was sealed, ultraviolet light of 5 mW/cm$^2$ and center wavelength 360 nm was emitted to the panel for 250 seconds at a temperature of 62.5° C. exhibiting the chiral nematic phase so that photopolymerization was performed.

The molecular orientation and electric-optical characteristic after photopolymerization of the cell in the fifth embodiment were the same as those in the first embodiment, so in the fifth embodiment, the half tone display and high-speed response were possible.

As detailed above, in the ferroelectric liquid crystal display element of the present invention, since a compound having at least two ultraviolet light sensitive portions in the molecular structure is mixed with the ferroelectric liquid crystal and the liquid crystal is exposed with ultraviolet light, and a continuous structure is formed over almost the whole length of the space between the two substrates so that the continuous twisted structure is formed between the substrates, in the state of the liquid crystal molecular orientation, high quality image display by high-speed moving picture display and half tone display with wide viewing angle become possible. Particularly, when the ferroelectric liquid crystal display element of the present invention is driven by an active element such as TFT, a moving picture display with high quality which has not been obtained before can be performed on the liquid crystal display.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of manufacturing a ferroelectric liquid crystal display element in which ferroelectric liquid crystal is sealed into a gap formed by at least two substrates and molecular orientation of said ferroelectric liquid crystal is stabilized by an orientation force applied on surfaces of said substrates, said method comprising the steps of:

injecting ferroelectric liquid crystal, to which a compound having at least two ultraviolet light sensitive portions in its molecular structure is added, into the gap formed by said substrates; and polymerizing said compound by exposure to an ultraviolet light so that a continuous twisted structure of said ferroelectric liquid crystal in a molecular orientation state is formed between said substrates.

2. The method of manufacturing ferroelectric liquid crystal display element according to claim 1, wherein said compound shows phase separation from said ferroelectric liquid crystal with said compound being mixed with said ferroelectric liquid crystal before the exposure to ultraviolet light.

3. The method of manufacturing ferroelectric liquid crystal display element according to claim 1, wherein a Chevron layer structure of said ferroelectric liquid crystal is converted into a bookshelf layer structure or a quasi-bookshelf layer structure by exposing said compound, which is in a state of phase separation from said ferroelectric liquid crystal, to ultraviolet light.

4. The method of manufacturing ferroelectric liquid crystal display element according to claim 1, wherein said compound is exposed to ultraviolet light in such a state that a mixture liquid crystal system which is obtained by mixing said compound with said ferroelectric liquid crystal exhibits a chiral nematic phase.

5. The method of manufacturing ferroelectric liquid crystal display element according to claim 1, wherein as the orientation force applied to the surfaces of said substrates, uniaxial orientation is given to the molecules of said ferroelectric liquid crystal so that their directions are at right angles to each other.

* * * * *